(12) United States Patent
Palmgren

(10) Patent No.: US 6,416,560 B1
(45) Date of Patent: Jul. 9, 2002

(54) FUSED ABRASIVE BODIES COMPRISING AN OXYGEN SCAVENGER METAL

(75) Inventor: Gary M. Palmgren, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/405,466

(22) Filed: Sep. 24, 1999

(51) Int. Cl.[7] .................................. B24D 17/00; B24D 3/00
(52) U.S. Cl. .............................. 51/309; 51/307; 51/293; 51/295
(58) Field of Search .................. 51/309, 307, 293, 51/295; 451/540, 542, 548

(56) References Cited

U.S. PATENT DOCUMENTS

| | | |
|---|---|---|
| 2,746,888 A | 5/1956 | Ross |
| 3,293,012 A | 12/1966 | Smiley et al. |
| 3,588,992 A | 6/1971 | Asaeda et al. |
| 3,650,714 A | 3/1972 | Farkas |
| 3,850,590 A * | 11/1974 | Chalkley et al. ............... 51/295 |
| 4,457,113 A | 7/1984 | Miller |
| 4,738,689 A | 4/1988 | Gigl et al. |
| 4,874,398 A | 10/1989 | Ringwood |
| 4,925,457 A | 5/1990 | deKok et al. |
| 4,948,388 A | 8/1990 | Ringwood |
| 5,024,860 A | 6/1991 | Chang |
| 5,232,469 A | 8/1993 | McEachron et al. |
| 5,250,086 A | 10/1993 | McEachron et al. |
| 5,306,318 A | 4/1994 | Carius et al. |
| 5,346,719 A | 9/1994 | Zarnoch et al. |
| 5,380,390 A | 1/1995 | Tselesin |
| 5,620,489 A | 4/1997 | Tselesin |
| 5,697,994 A | 12/1997 | Packer et al. |
| 5,725,421 A | 3/1998 | Goers et al. |
| 5,853,873 A | 12/1998 | Kukino et al. |
| 6,110,031 A | 8/2000 | Preston et al. |

FOREIGN PATENT DOCUMENTS

| | | |
|---|---|---|
| DE | 2 275 690 | 9/1994 |
| EP | 0 467 404 A1 | 1/1992 |
| GB | 516474 | 1/1940 |
| JP | 57068287 | 4/1982 |
| WO | WO 90/05170 | 5/1990 |
| WO | WO 98/10110 | 3/1998 |
| WO | WO 98/415091 | 10/1998 |
| WO | WO 98/58770 | 12/1998 |

OTHER PUBLICATIONS

Database WPI, Derwent Publications Ltd., XP002153122, 4/82.

"Introduction to the Metallurgical Thermodynamics", $2^{nd}$ Edition, McGraw–Hill Book Company, by David R. Gaskell, p. 287, 1981 (No month).

"Handbook of Chemistry and Physics", $76^{th}$ Edition (1995–1996), CR Press, 1995, by David R. Lide, Editor, pp. 5–72 to 5–75, (No month).

"Introduction to the Thermodynamics of Materials", $3^{rd}$ Edition, Taylor & Francis, by David R. Gaskell, pp. 361–363, (Date unknown).

"MBS*–960 Diamond Titanium and Chromium Coated Products", GE Superabrasives brouchure, Copyright 1995, (No month).

"The MBS* 900 Series P;roduct Line", GE Superabrasives brochure, Copyrigh 1996, (No month).

"Super Coatings for Superabrasives", Cutting Tool Enginnering, Jun., 1997, by Alan Carius, pp. 40–46.

* cited by examiner

*Primary Examiner*—Michael Marcheschi
(74) *Attorney, Agent, or Firm*—Scott R. Pribnow

(57) ABSTRACT

A fused metal matrix abrasive body and method of preparing a fused metal matrix abrasive body is provided. The fused metal matrix abrasive body comprises a plurality of metal coated abrasive particles and a fused metal matrix comprising a bond metal and an effective amount of an oxygen scavenger metal. The metal coated abrasive particles are distributed in the fused metal matrix which bonds the abrasive particles together. The oxygen scavenger metal functions as a scavenger (i.e., "getter") for oxygen thereby protecting the adhesion promoting metal coating on the abrasive particle from the oxidation.

17 Claims, 7 Drawing Sheets

FUSED ABRASIVE BODIES COMPRISING AN OXYGEN SCAVENGER METAL

BACKGROUND

This invention relates to fused metal bond abrasive bodies and to methods of making the same.

It is known to use a metal matrix to hold superabrasive particles (e.g., diamond and cubic boron nitride) in an abrasive body. Such metal matrix abrasive bodies may be utilized in grinding wheels, such as pencil-edging wheels, and the like. Ideally, the bond between the metal matrix and the abrasive particles must be strong enough to retain the abrasive particles in the matrix as the abrasive particles abrade a workpiece.

It is also known that metal coatings may be used to improve the retention of abrasive particles in such metal matrices. For example, diamond abrasive particles may be advantageously coated with carbide forming metals which chemically bond to the surface of the diamond through the formation of a metal carbide. Metal coatings may add texture to the surface of diamond or cubic boron nitride abrasive particles which typically are smooth and difficult to bond to. A textured surface may allow the coated abrasive particle to be held more aggressively in the metal matrix through mechanical adhesion. Metals suitable for adhesion-promoting coatings include, for example, molybdenum, titanium, and chromium, which may be applied by a hot salt method or a vapor deposition method.

Typically, metal matrix abrasive bodies are formed by a fusing process. Fusing processes are well known and include, for example, sintering, brazing, melting, impregnation or combinations thereof. To form the metal matrix abrasive body, a fusible composition, typically comprising a metal powder and abrasive particles, is heated to a temperature for a period of time sufficient to consolidate the metal powder particles such that they bond to one another. Fusing by a sintering process, for example, is typically conducted in an air atmosphere at a relatively high temperature, for example, 700–1100 ° C., and at an elevated pressure. Under such conditions, oxidation of the various components of the sinterable composition may result. It has been recognized that oxidation of the very thin adhesion-promoting coating on the abrasive particles may deteriorate the adhesion-promoting function of the coating. Accordingly, materials and techniques have been developed to reduce or eliminate oxidation.

One method by which oxidation has been minimized is by coating an oxidation-resistant layer over the adhesion-promoting coating. This technique, however, adds expense to the abrasive particles since they must be coated with at least two materials. Further, the outer coating may not adhere well to the adhesion-promoting coating thereby resulting in a weak interface between the abrasive particle and the metal matrix. U.S. Pat. No. 5,024,860 reports the use of chromium, titanium or zirconium carbide-forming layer as part of a multi-layer coating on diamond particles to aid retention within a matrix. Two carbide-forming layers are applied; one thin base layer and a thick oxidation resistant second layer. The thick multi-layer construction provides increased oxidation resistance over thinner single coatings.

Oxidation may also be minimized by fusing (e.g., sintering) in a non-oxidizing atmosphere, for example, a nitrogen atmosphere or under very low air pressure. This type of process, however, is undesirable due to the high cost and process complexity associated with providing the non-oxidizing atmosphere. Specifically, fusing in a non-oxidizing atmosphere is typically conducted using an expensive vacuum furnace. In addition, if the fusible composition contains organic compounds (e.g., binders) that burn off during the fusing process, maintenance of the non-oxidizing atmosphere is further complicated. Another way in which oxidation may be minimized is by cleaning metal oxide contaminants from the metal powders prior to fusing the powders. This cleaning process adds an additional processing step and associated expense.

Although the foregoing techniques may be utilized to reduce oxidation of the adhesion promoting coating on the abrasive particles, what is desired is a more convenient method of reducing oxidation of adhesion promoting metal coatings on abrasive particles in fused abrasive bodies.

SUMMARY

The present invention provides fused abrasive bodies comprising a plurality of metal coated abrasive particles bonded together by a metal matrix. The metal coated abrasive particles each comprise an abrasive particle having an outer adhesion-promoting metal coating. The fused abrasive body also comprises at least an effective amount of an oxygen scavenger metal. Suitable oxygen scavenger metals are selected to be competitively oxidized relative to the metal coating on the abrasive particles. In this way, oxygen present during the fusing of the abrasive body reacts, at least in part, with the oxygen scavenger metal thereby protecting the metal coated abrasive particles from oxidation. As a result, oxidation of the adhesion promoting coating on the abrasive particles is at least reduced, preferably eliminated. Suitable oxygen scavenger metals may be selected with the aid of an Ellingham diagram which predicts, at a given fusing temperature whether a given metal will be competitively oxidized relative to the metal comprising the adhesion promoting coating on the abrasive particles.

As used herein, the term "competitively oxidized" means that the oxygen scavenger metal reacts with oxygen at a rate which is at least equal to, preferably greater than, the rate at which the metal comprising the adhesion promoting coating on the abrasive particles reacts with oxygen. More specifically, with reference to an Ellingham diagram a suitable oxygen scavenger metal (1) provides a partial pressure of oxygen at the fusing temperature which is less than or equal to the partial pressure of oxygen provided by the metal comprising the adhesion promoting coating on the abrasive particles at the fusing temperature; or (2) provides a Gibbs free energy of oxidation at the fusing temperature which is less than or equal to the Gibbs free energy of oxidation provided by the metal comprising the adhesion promoting coating on the abrasive particles at the fusing temperature.

Accordingly, in a preferred embodiment of the present invention the oxygen scavenger metal provides a partial pressure of oxygen at the fusing temperature which is less than or equal to the partial pressure of oxygen provided by the metal comprising the adhesion promoting coating on the abrasive particles at the fusing temperature.

In another preferred embodiment of the present invention the oxygen scavenger metal provides a Gibbs free energy of oxidation at the fusing temperature which is less than or equal to the Gibbs free energy of oxidation provided by the metal comprising the adhesion promoting coating on the abrasive particles at the fusing temperature.

In yet another preferred embodiment of the present invention, the abrasive particles comprise diamond, cubic boron nitride and the outer adhesion promoting coating on the abrasive particles comprises titanium, chromium, or an alloy thereof.

In yet another preferred embodiment of the present invention, the oxygen scavenger metal comprises aluminum, calcium, magnesium, zirconium or a combination thereof and is present in the fusible composition in an amount ranging from about 0.1–10% by-wt.

In fused abrasive bodies of the present invention the abrasive particles may be randomly or non-randomly distributed throughout the fused metal matrix. When non-randomly distributed, the abrasive particles may be concentrated in the fused metal matrix in substantially parallel planar layers of abrasive particles.

Metal matrix abrasive bodies of the present invention are particularly suited for use in cutting and grinding wheels. Accordingly, in yet another preferred embodiment of the present invention, a cutting or grinding wheel is provided comprising at least one metal matrix abrasive body of the present invention.

The present invention also provides a method of making a fused metal matrix abrasive body as described above, the method comprising the steps of:
  (a) providing a fusible composition comprising:
    a plurality of metal coated abrasive particles;
    a bond metal powder; and
    an effective amount of an oxygen scavenger metal powder; and
  (b) fusing the fusible composition of step (a) by sintering, brazing, melting or impregnating the fusible composition.

As used herein, the following terms have the following meanings:

"Fused" refers to a process wherein metal particles such as metal powders are bonded to one another by the application of heat. Fusing of metal particles may be accomplished by processes such as sintering, brazing, melting, impregnation or a combination thereof. Fusing of metal particles may be accomplished at temperatures above or below the melting point of the metal powders being fused and may include applying pressure to the fusible composition.

"Fusible" refers to a composition capable of being fused.

"Sintering" refers to the bonding of metal particles by solid-state reaction at temperatures lower than those required for the formation of a liquid phase. Fusible compositions of the present invention are typically sintered at temperatures ranging from about 700–1100° C. and pressures ranging from about 100 to 500 kg/cm$^2$.

"Brazing" refers to the process of bonding metal particles using a material having a melting point lower than the metal particles being joined.

"Melting" refers to the process wherein metal particles are bonded to one another by converting the metal particles from a solid to a liquid by application of heat.

"Impregnation" refers to the process of forcing a liquid substance into the pores of a solid.

In a preferred embodiment of the present invention, the oxygen scavenger metal is added to the fusible composition in form of a substantially pure metal. By substantially pure it is meant that the oxygen scavenger metal is added to the fusible composition in a form comprising at least 50%-wt or greater oxygen scavenger metal, more preferably 80%-wt. or greater oxygen scavenger metal, yet more preferably 95%-wt or greater oxygen scavenger metal and most preferably 99%-wt. or greater oxygen scavenger metal.

In another preferred embodiment of the present invention, the fusible composition further includes a binder, most preferably a polymeric material such as polyvinyl butyral.

In yet another preferred embodiment of the present invention, the bond metal powder and the oxygen scavenger metal powder are provided in the form of a bond material layer in the form of a sheet having a first major surface and a second major surface. Prior to fusing, the abrasive particles are distributed over at least one major surface of the bond material layer to form the fusible composition. The abrasive particles may be distributed over the major surface of the bond material layer in a non random array.

In yet another preferred embodiment of the present invention, the fusible composition is prepared according to the following method:
  (a) providing a bond material layer in the form of a sheet, the bond material layer comprising a metal powder, an effective amount of an oxygen scavenger metal and a binder;
  (b) providing a porous sheet material having a first major surface a second major surface and a plurality of openings extending from said first major surface to said second major surface;
  (c) adhering an adhesive tape to one major surface of the porous sheet material;
  (d) positioning metal coated abrasive particles in at least some of the openings of the porous material to form an assembly; and
  (e) placing the assembly of step (d) in contact with at least one major surface of the bond material layer of step (a) to form a fusible composition.

In a preferred embodiment of this method, a fusible composition including more than one substantially parallel planar layers of metal coated abrasive particles is prepared by stacking 2 to 10,000 of the fusible compositions of step (e) one on top of another. The fusible composition is then fused to provide an abrasive body comprising more than one substantially parallel planar layers of metal coated abrasive particles.

DETAILED DESCRIPTION

The present invention provides fused metal matrix abrasive bodies having improved retention of abrasive particles. Specifically, the present invention provides fused metal matrix abrasive bodies comprising a plurality of metal coated abrasive particles distributed throughout a metal matrix. The metal coated abrasive particles each comprise an abrasive particle having an outer adhesion-promoting metal coating. The metal matrix includes a bond metal and at least an effective amount of an oxygen scavenger metal. The oxygen scavenger metal functions to react with oxygen present during the fusing process thereby reducing or eliminating oxidation of the adhesion-promoting coating.

Figure 1:
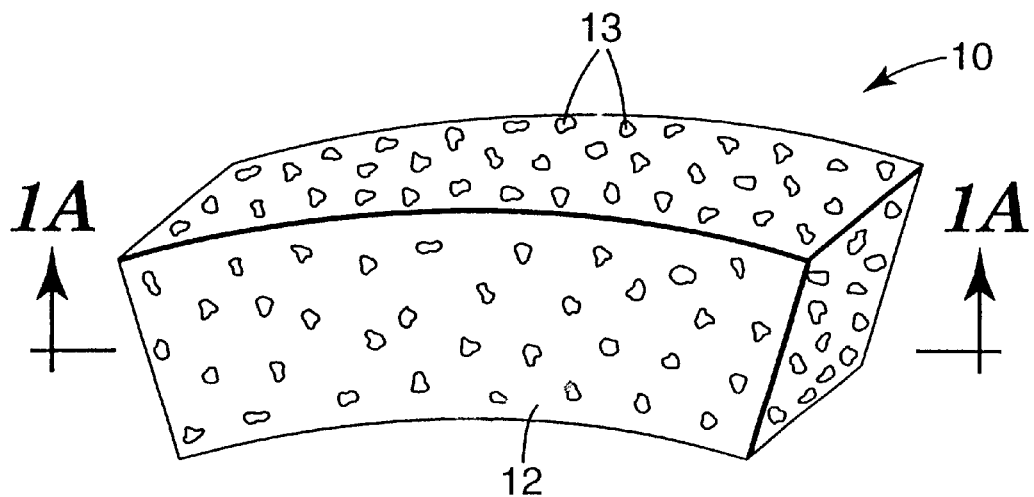
FIG. 1 is a perspective view of a fused metal matrix abrasive body of the present invention in the form of a segment for a cutting or grinding tool.
Figure 1A:
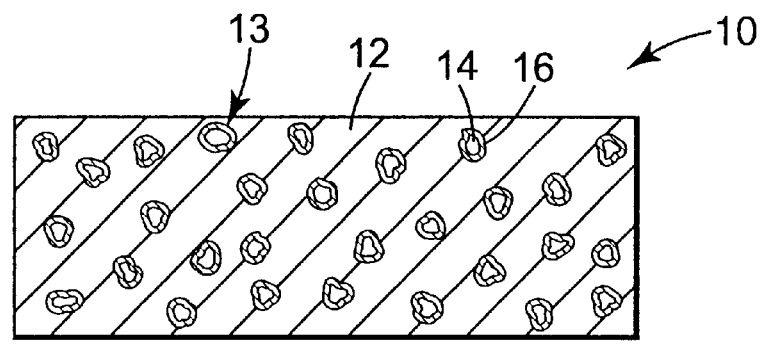
FIG. 1A is a cross sectional view of the fused metal matrix abrasive body of FIG. 1 taken at section line 1A.

Referring now to FIG. 1, a perspective view of an embodiment of a fused abrasive body 10 of the present invention is shown. Fused abrasive body 10 is in the form of an arcuate segment suitable for use in a cutting or grinding wheel. Fused abrasive body 10 includes metal matrix 12 having distributed throughout a plurality of metal coated abrasive particles 13. FIG. 1A is a cross-sectional view of fused abrasive body 10 taken along section line 1A. As shown in FIG. 1A, metal coated abrasive particles 13 are randomly distributed throughout metal matrix 12. Each metal coated abrasive particle 13 comprises an abrasive particle 14 having an outer adhesion-promoting metal coating 16. Abrasive particles 14 preferably comprise diamond, however, other abrasive particles cush as cubic boron nitride are also within the scope of this invention. Outer adhesion-promoting metal coating 16 preferably comprises titanium or chromium. Fused abrasive body 10 includes metal matrix 12 which binds metal coated abrasive particles 13 together in a composite mass. Metal matrix 12 comprises at least one bond metal and an effective amount of an oxygen scavenger metal.

Figure 2:
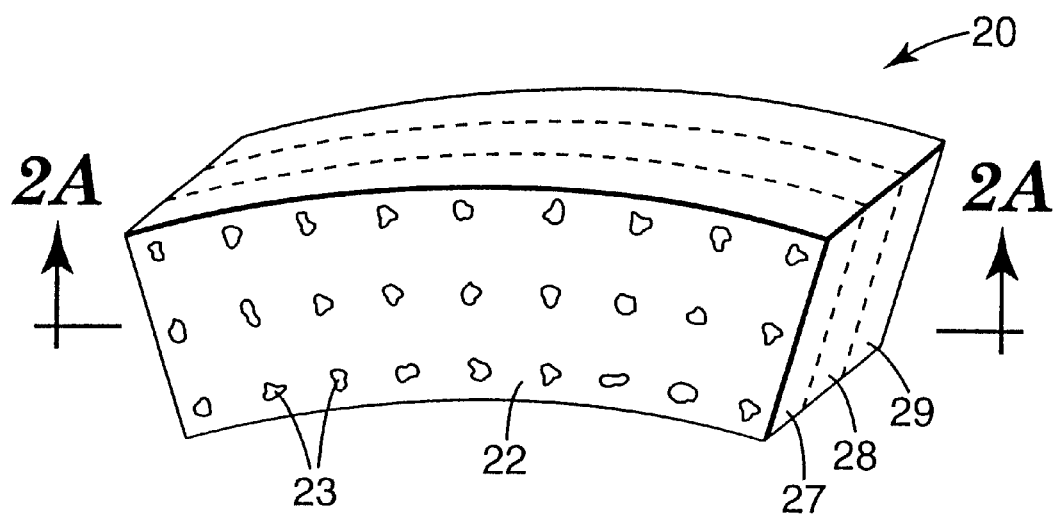
FIG. 2 is a perspective view of a fused metal matrix abrasive body of the present invention in the form of a segment for a cutting or grinding tool.
Figure 2A:
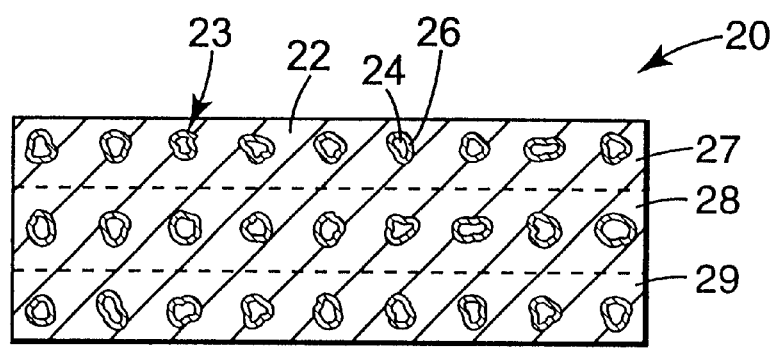
FIG. 2A is a cross sectional view of the fused metal matrix abrasive body of FIG. 2 taken at section line 2A.

Referring now to FIG. 2, a perspective view of an embodiment of a sintered abrasive body 20 of the of the present invention is shown. Sintered abrasive body 20 is in the form of an arcuate segment suitable for use in a cutting or grinding wheel. Sintered abrasive body 20 includes metal matrix 22 having dispersed throughout a plurality of metal coated abrasive particles 23. Metal matrix 22 functions to bind the metal coated abrasive particles 23 together in a composite mass. FIG. 2A is a cross sectional view of sintered abrasive body 20 taken along section line 2A. In this embodiment, metal coated abrasive particles 23 are distributed throughout the the metal matrix 22 in substantially parallel planar layers 27, 28 and 29. Metal matrix 22 comprises at least one bond metal and an effective amount of an oxygen scavenger metal. Each metal coated abrasive particle 23 comprises an abrasive particle 24 having an outer adhesion-promoting metal coating 26. Preferably, the abrasive particles 23 comprise diamond, howcer, other abrasive particles such as cubic boron nitride are also within the scope of this invention. Outer adhesion-promoting metal coating 26 preferably comprises titanium or chromium.

Abrasive Particles

Abrasive particles suitable for use in the fused abrasive bodies of the present invention include at least one adhesion-promoting coating comprising a metal or metal alloy. The metal coating acts to increase the adhesion between the abrasive particles and the metal matrix. For diamond abrasive particles, the metal adhesion-promoting coating typically comprises a metal capable of forming a carbide with the diamond. In this way, the metal adhesion-promoting coating advantageously forms a chemical bond to the diamond abrasive particle. The metal coating may also function to prevent chemical reaction between the metal matrix and the abrasive particles. Such chemical reaction may lead to undesired graphitization of the diamond resulting in a loss of hardness, strength and abrasion resistance of the diamond. Suitable carbide forming metals include, for example, molybdenum, titanium and chromium. The metal coatings typically have a thickness ranging from about 0.5–5 $\mu$m and may be applied to the abrasive particles using any suitable technique, for example, hot salt application or metal vapor deposition.

Suitable abrasive particles include any type of abrasive particles that may be coated with one or more metal coatings to provide improved adhesion to a metal matrix. Preferred abrasive particles include diamond particles and cubic boron nitride particles although other types of abrasive particles are within the scope of this invention. The abrasive particles may be of any size useful in a fused abrasive body. Typically, the abrasive particles range in size from about 0.1–1000 $\mu$m, more preferably ranging from about 40–1000 $\mu$m and most preferably ranging in size from about 60–700 $\mu$m. Preferred abrasive particles comprise diamond having an outer adhesion promoting coating comprising titanium. Such abrasive particles are commercially available from General Electric Co. (Worthington Ohio.) under the trade designation "MBS-960TI2" and from DeBeers. Diamond abrasive particles having an outer adhesion promoting coating comprising chromium are commercially available under the trade designation "MBS-960CR2" also from General Electric.

Metal Matrix

A fused abrasive body of the present invention includes a metal matrix that functions to bond the abrasive particles together. The metal matrix comprises at least one bond metal and at least one oxygen scavenger metal.

Bond Metal

Suitable bond metals for fused abrasive bodies of the present invention include, for example, bronze, cobalt, tungsten, copper, iron, nickel, tin, chromium, or mixtures or alloys thereof. Among other considerations, the particular composition of the bond metal may be selected by one of skill in the art having knowledge of the intended use of the fused abrasive body. Various bond metals may be chosen, for example, to provide the desired hardness, wear resistance, impact resistance, adhesion of abrasive particles, etc. In many grinding wheel applications, the bond metal comprises mainly copper, iron, nickel, tin, chromium, and tungsten carbide with minor amounts (e.g., less than about 1%-wt. each) of boron, silica, cobalt and phosphorus. The bond metal typically comprises from about 75–99%-volume of the fused abrasive body, more preferably comprising from about 75–85%-volume of the fused abrasive body.

The bond metal is preferably formed from a metal powder or mixture of metal powders which are fused to form a consolidated metal matrix. The fusing of the metal powder may be accomplished using a sintering, brazing, melting or impregnation process. Preferably, the metal powders are fused using a sintering process, for example, by heating at a temperature from about 700–1100° C. Suitable metal powders are commercially available from Lucas Milhaupt, Inc. (Cudacky, Wis.) and Wall Colomony Corp. (Madison, Mich.).

Oxygen Scavenger Metal

The metal matrix also includes an effective amount of an oxygen scavenger metal. The oxygen scavenger metal functions to scavenge at least a portion of any oxygen that is present during the sintering of the abrasive body. As used herein the term "scavenger" refers to a material that is added to a mixture to remove or inactivate unwanted materials. Scavenging of oxygen occurs by an oxidation process wherein the oxygen scavenger metal reacts with at least some of the oxygen that is present during the fusing of the fusible composition. This reaction results in the oxygen scavenger metal being converted into an oxide. By way of example, aluminum (Al) may act as an oxygen scavenger metal by reacting with oxygen ($O_2$) to form aluminum oxide ($Al_2O_3$).

By reacting with (i.e., scavenging) the oxygen present during the sintering of the abrasive body, the oxygen scavenger metal functions to protect the adhesion-promoting coating on the abrasive particles from oxidation. By protect, it is not meant that the oxygen scavenger metal interacts or reacts directly with the adhesion promoting metal coating on the abrasive particles. Rather, the oxygen scavenger metal acts as a sacrificial oxidation agent or "getter" for oxygen. At least a portion of the oxygen present during the fusing operation is scavenged by the oxygen scavenger metal and therefore, does not react with (i.e., oxidize) the adhesion-promoting metal coating on the abrasive particles. Suitable oxygen scavenger metals are competitively oxidized as compared with the adhesion promoting metal coating on the abrasive particles. As defined above, the term "competitively oxidized" means that the oxygen scavenger metal reacts with oxygen at a rate which is at least equal to, preferably greater than, the rate at which the metal comprising the adhesion promoting coating on the abrasive particles reacts with oxygen.

Figure 3:
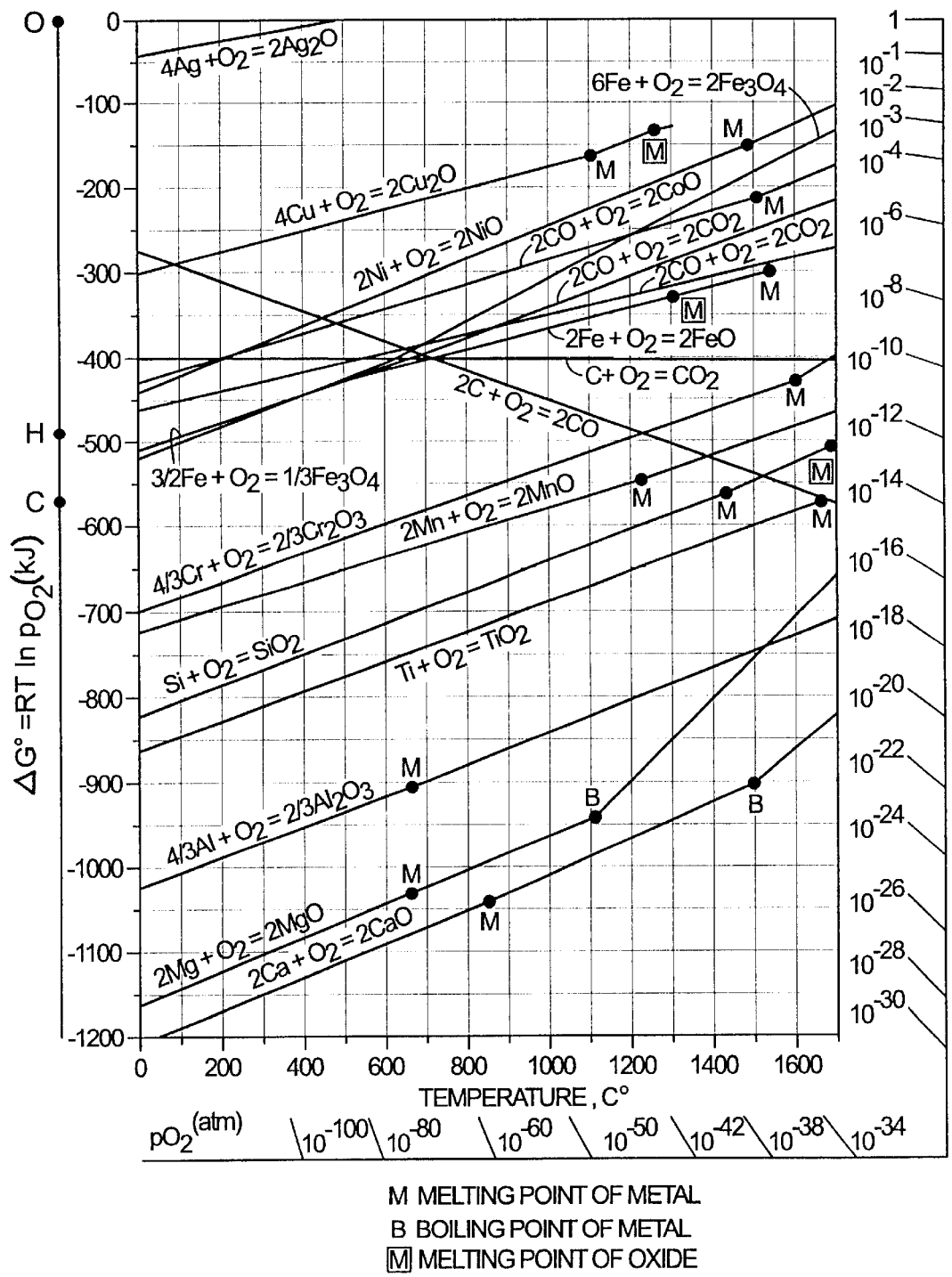
FIG. 3 is an Ellingham diagram.
Figure 10:
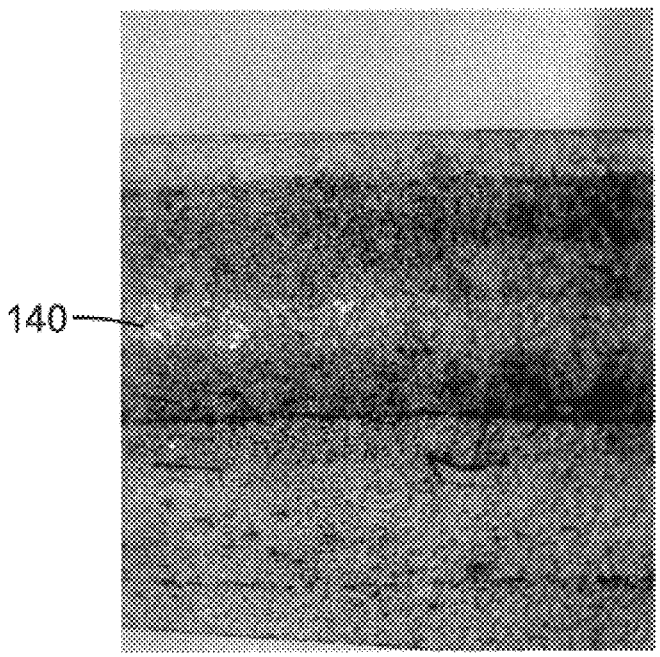
FIG. 10 is a digital image of a surface of a fused metal matrix abrasive body of the present invention after being subjected to the Rocker Drum Test.
Figure 11:
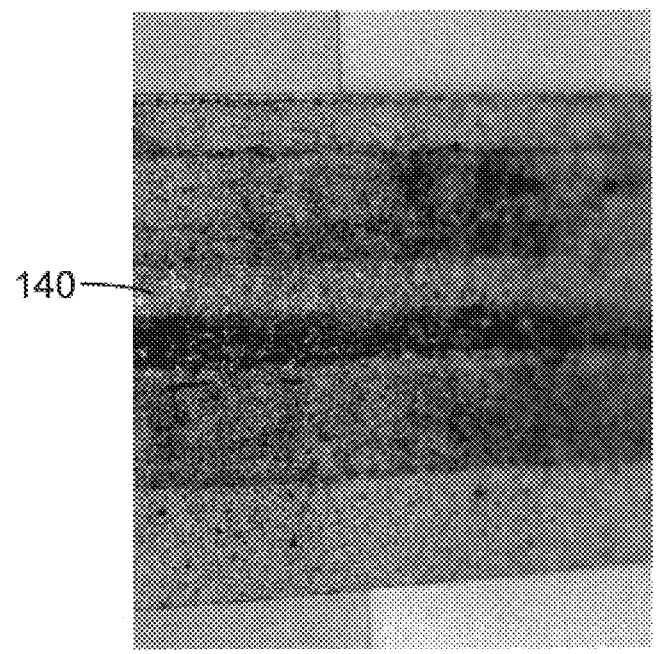
FIG. 11 is a digital image of a surface of a fused metal matrix abrasive body of the present invention after being subjected to the Rocker Drum Test.

Selection of suitable oxygen scavenger metal for a particular fused abrasive body may be aided by the use of an Ellingham diagram. An Ellingham diagram may be used to predict the partial pressure of oxygen (hereafter $pO_2$) that will exist in equilibrium with a given metal at a given temperature. An Ellingham diagram is shown in FIG. 3. An Ellingham diagram may also be found in Figure 10.13 of David R. Gaskell, *Introduction to the Metallurgical Thermodynamics*, $2^{nd}$ Edition, McGraw-Hill Book Co, page 287, the Ellingham diagram being incorporated herein by reference.

Referring now to FIG. 3 an Ellingham diagram is shown. The Ellingham diagram includes "Ellingham lines" for a number of metal oxidation reactions. For example, an Ellingham line for the oxidation of aluminum is labeled with the reaction equation $4/3Al+O_2 \rightarrow 2/3Al_2O_3$. Along the x-axis of the Ellingham diagram a temperature scale in °C. is provided. Along the y-axis of the Ellingham diagram a $\Delta G_{oxid}$ scale in joules/mole is provided. To employ the Ellingham diagram for the particular metal oxidation reaction of interest, the point of intersection of the vertical line (i.e., parallel to the y-axis) corresponding to the temperature of interest and the Ellingham line for the metal oxidation of interest is first located on the diagram. Next, a line is drawn connecting this point to the point labeled "O" located in the upper left hand corner of the diagram. The line defined by these two points is then extended until it intersects the $pO_2$ scale on the bottom and right sides of the diagram. This point of intersection on $pO_2$ scale is equal to the $pO_2$ (atm) in equilibrium with the metal of interest at the temperature of interest.

Using the procedure outlined above, a suitable oxygen scavenger metal for a fused abrasive body of the present invention provides an equilibrium $pO_2$ at the fusing temperature that is equal to or less than the equilibrium $pO_2$ at the fusing temperature provided by the metal comprising the outer adhesion promoting coating of the abrasive particles. Suitable oxygen scavenger metals are competitively oxidized relative to the metal comprising the adhesion promoting coating on the abrasive particles. By way of example, using the Ellingham diagram of FIG. 3 at a temperature of 800° C., the $pO_2$ in equilibrium with titanium is about $10^{-36}$ atm ($10^{-34}$ kPa). For aluminum at 800 ° C., the equilibrium $pO_2$ is about $10^{-42}$ atm ($10^{-40}$ kPa). Since the $pO_2$ in equilibrium with aluminum is less than the $pO_2$ in equilibrium with titanium, aluminum is a suitable oxygen scavenging metal when titanium is used as the adhesion-promoting metal coating on the abrasive particles, for abrasive bodies fused at about 800° C. Examples of oxygen scavenging metals that may be used when titanium is used as the adhesion-promoting coating on the abrasive particles include, for example, aluminum, calcium, magnesium and titanium and mixtures thereof. With the exception of titanium, the Ellingham lines for these materials appear below the line for titanium on the Ellingham diagram.

Another way to predict suitable oxygen scavenger metals suitable for use with a given adhesion-promoting coating is to determine the Gibbs free energy of oxidation (hereafter $\Delta G_{oxid}$) at the fusing conditions for both the oxygen scavenger metal and the metal comprising the adhesion promoting coating. A suitable oxygen scavenger metal will have a $\Delta G_{oxid}$ at the fusing conditions which is less or equal to the $\Delta G_{oxid}$ of the metal comprising the adhesion promoting coating on the abrasive particles at the same conditions.

Referring now to FIG. 3, the $\Delta G_{oxid}$ for a metal oxidation reaction of interest at a temperature of interest may be determined from the Ellingham diagram. First, the point of intersection of the vertical line corresponding to the temperature of interest and the Ellingham line for the metal oxidation reaction of interest is located on the diagram. Next, a horizontal line is drawn from this point, parallel to the x-axis, until it intersects the y-axis. This point of intersection is equal to the $\Delta G_{oxid}$ for the metal oxidation reaction of interest at the temperature of interest.

A summary of $\Delta G_{oxid}$ and $pO_2$ for useful oxygen scavenger metals and adhesion promoting coatings is provided in Table 1 at a pressure of 1 atm (101.325 kPa) and a temperature of 950° C.

TABLE 1

| | $\Delta G_{oxid}$ (joules/mole) | $pO_2$ (atm) |
|---|---|---|
| Chromium | $-5.1 \times 10^5$ | $1.0 \times 10^{-22}$ ($1.0 \times 10^{-20}$ kPa) |
| Manganese | $-6.1 \times 10^5$ | $7.6 \times 10^{-27}$ ($7.7 \times 10^{-25}$ kPa) |
| Silicon | $-6.9 \times 10^5$ | $3.1 \times 10^{-30}$ ($3.1 \times 10^{-28}$ kPa) |
| Titanium | $-7.2 \times 10^5$ | $1.4 \times 10^{-31}$ ($1.4 \times 10^{-29}$ kPa) |
| Aluminum | $-8.2 \times 10^5$ | $1.3 \times 10^{-35}$ ($1.3 \times 10^{-33}$ kPa) |
| Zirconium | $-8.3 \times 10^5$ | $2.5 \times 10^{-36}$ ($2.5 \times 10^{-34}$ kPa) |
| Magnesium | $-9.7 \times 10^5$ | $5.3 \times 10^{-42}$ ($5.4 \times 10^{-40}$ kPa) |
| Calcium | $-1.0 \times 10^6$ | $2.2 \times 10^{-43}$ ($2.2 \times 10^{-41}$ kPa) |

David R. Lide, Editor, *Handbook of Chemistry and Physics*, $76^{th}$ Edition (1995–1996), CRC Press, 1995, pages 5–72 to 5–75.

As shown in the Ellingham diagram and Table 1, if titanium is selected as the adhesion promoting metal coating on the abrasive particles, suitable oxygen scavenger metals include, for example, aluminum, calcium, magnesium and titanium. Also, if chromium is selected as the adhesion promoting metal coating on the abrasive particles, suitable oxygen scavenger metals include, for example, aluminum, calcium, magnesium, manganese, silicon and titanium.

An effective amount of the oxygen scavenger metal must be added to the fusible composition. As used herein the phrase "an effective amount" refers to the amount of oxygen scavenger metal that is required in a particular fusible composition in order to provide improved retention of the abrasive particles in the metal matrix of the abrasive body as measured by at least one of the test procedures described herein. It is understood, that an effective amount of oxygen scavenger metal may vary from fusible composition to fusible composition. For example, the effective amount may depend upon factors including, but not limited to, the physical and compositional form of the oxygen scavenging metal, the amount of oxygen present in the atmosphere during fusing, the fusing temperature, the amount of oxygen present in the materials making up the fusible composition, the melting point of the oxygen scavenger metal and the shape and form of the abrasive body to be fused. The addition of oxygen scavenger metal in excess of the effective amount may not be desirable in some instances, for example, as the oxygen scavenger metal may deleteriously affect the physical properties of the resulting sintered abrasive body. For example, a high aluminum content (e.g., greater than about 10%-wt.) may result in the abrasive body being too soft for some abrading applications. Typically, the oxygen scavenger metal will comprise from about 0.1–10%-wt. of the fusible composition, more preferably comprising about 0.25–5%-wt. of the fusible composition and most preferably comprising about 0.5–2%-wt of the fusible composition.

Preferably, the oxygen scavenging metal will be provided in the physical form of a fine metal powder and will be uniformly dispersed throughout the fusible composition. When provided in the form of a uniformly dispersed fine metal powder, kinetic (i.e., diffusion) inhibition of the reaction of oxygen with the oxygen scavenger metal will be minimized since the oxygen scavenger metal will be present throughout the fusible composition and will be available to react with oxygen which may be present throughout the fusible composition. Further, per unit of mass, the surface area of the metal powder will typically increase as the particle size decreases. A high surface area promotes greater reactivity of the oxygen scavenger metal. Accordingly, preferred metal powders for the oxygen scavenger metal have particle sizes ranging from about 5–200 $\mu$m, more preferably ranging from about 15–120 $\mu$m.

Compositional form of the oxygen scavenger metal may also affect the effective amount of the metal required in a particular fusible composition. Preferably, the oxygen scavenger metal will be incorporated into the fusible composition in the form of a substantially pure metal rather than, for example, an alloy. Thermodynamically, the chemical activity of the oxygen scavenger metal will be approximately equal to the mole fraction of the oxygen scavenger metal in an alloy. Therefore, an alloy of an oxygen scavenger metal in alloy form with a second metal that is not an oxygen scavenger metal (or is a less effective oxygen scavenger metal) will be less effective than if the oxygen scavenger metal were supplied in substantially pure (i.e., non alloy) form. In addition, the rate of the reaction of the oxygen scavenger metal will be limited by the diffusion rate of the oxygen scavenger metal through the alloy. Diffusion inhibition may result in less efficient oxygen scavenging by the oxygen scavenger metal which may result in more oxidation of the adhesion promoting coating on the abrasive particles. By substantially pure it is meant that the oxygen scavenger metal is added to the fusible composition in a form comprising at least about 50%-wt. or greater oxygen scavenger metal, more preferably about 80%-wt. or greater oxygen scavenger metal, most preferably about 95%-wt. or greater oxygen scavenger metal, and particularly most preferably 99%-wt. or greater oxygen scavenger metal. Further, it is preferred that the oxygen scavenger metal is substantially uncontaminated with non-metals such as sulfur and oxygen. By substantially uncontaminated with non-metals it is meant that the oxygen scavenger metal is provided in a form comprising less than a stoichiometric amount of non-metal contaminants that may form a reaction product with the oxygen scavenger metal, preferably less than 10% of a stochiometric amount of non-metal contaminants that may form a reaction product with the oxygen scavenger metal. It is to be understood that for some oxygen scavenger metals, for example, aluminum, the surface of the oxygen scavenger metal may be oxidized with an impervious oxide layer that prevents oxidation of the surface of the metal.

Melting point may also affect the effective amount of the oxygen scavenger metal required in a particular fusible composition. Preferably, the melting point of the oxygen scavenger metal occurs at a temperature that is less than the fusing temperature. This allows the oxygen scavenger metal to melt and to flow throughout the fusible composition which may result in more efficient scavenging of the oxygen present during the fusing process.

It is to be understood that the presence of an oxygen scavenging metal may not and typically will not completely eliminate oxidation of the adhesion promoting coating on the abrasive particles. Rather, an effective amount of an oxygen scavenger metal functions to prevent substantial oxidation of the adhesion promoting coating on the abrasive particles such that the adhesion between the abrasive particles and the metal matrix is greater than if no oxygen scavenger metal were present.

Method of Making Fusible Compositions and Fused Abrasive Bodies

In one embodiment of a fused abrasive body of the present invention, the abrasive particles are randomly distributed throughout the matrix. To prepare such an abrasive body, a fusible composition is first prepared by combining a metal powder, a plurality of metal coated abrasive particles, an effective amount of an oxygen scavenger metal and any desired optional ingredients (e.g., organic binders, hard particles (e.g., tungsten carbide particles)). Organic binders include polymers, for example, polyvinyl butyral, and are included in the fusible composition to allow consolidation of the metal powders into a shaped mass, known as a green body, that can be physically handled. Preferably, the organic binder is included in the fusible composition in the minimum amount necessary to provide the desired properties due to the fact that the organic binder must burn off during the fusing process. Optionally, hard particles such as tungsten carbide may be added to fusible composition to increase the wear resistance of the resulting fused abrasive body. Typically, hard particles are added in an amount ranging from about 10–50%-wt. of the fusible composition although amounts outside of this range may be advantageous in some compositions. Organic solvents may be added to the fusible composition in an amount necessary to solvate the organic binder. Typical organic solvents include, for example, methyl ethyl ketone and are added to the fusible composition in an amount minimally necessary to solvate the binder.

Once the fusible composition is prepared, it is then cold compacted in a mold using a press to form a green state compact. The green state compact is then fused. Fusing may be accomplished by sintering, brazing, melting and/or impregnating the fusible composition. In a preferred embodiment of the present invention, the fusible composition is sintered. Sintering temperatures typically range from about 700–1100 ° C. and typical sintering times range from about 5–30 minutes. Pressure may be also applied during the sintering process. Typical sintering pressures range, for example, from about 100–500 kg/cm$^2$. After fusing, the resulting fused abrasive body may be cut to the desired size and shape.

In another embodiment of a fused abrasive body of the present invention the abrasive particles are non-randomly distributed throughout the metal matrix. For example, the abrasive particles may be concentrated one or more substantially planar layers within the metal matrix. Such a sintered abrasive body may be formed, for example, by the techniques reported in U.S. Pat. No. 5,380,390 (Tselesin), the disclosure of which is incorporated herein by reference.

Figure 4:
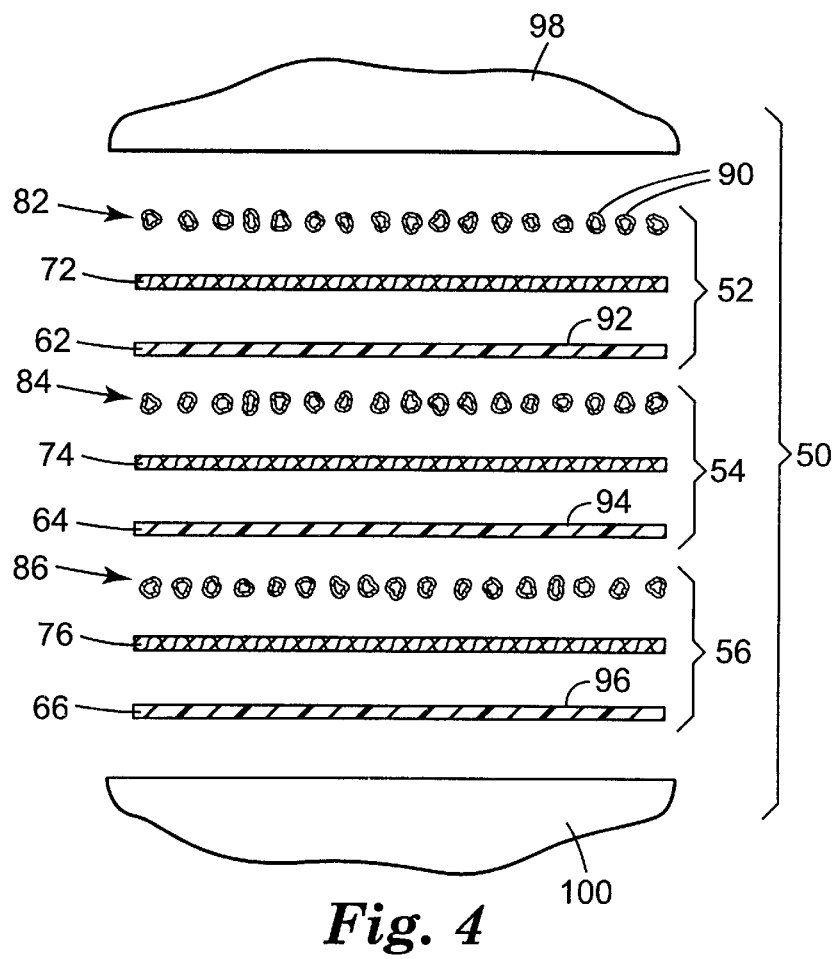
FIG. 4 is an cross section exploded view of a fused metal matrix abrasive body of the present invention.

A method of fabrication of an abrasive body having substantially parallel planar layers of abrasive particles (see, for example, FIG. 2) is reported in U.S. patent application Ser. No. 08/882,434 (filed Jun. 25, 1997) U.S. Pat. No. 6,110,031 titled "Superabrasive Cutting Surface", the disclosure of which is incorporated herein by reference. FIG. 4 is an exploded cross sectional view of an abrasive body 50 showing the stack up of the layers which can be used in the fabrication of abrasive body 50 having substantially parallel planar layers of abrasive particles. For purposes of illustration, abrasive body 50 is made up of only three layers 52, 54 and 56. However, abrasive body 50 may be made up of a different number of layers and is typically made up of from 1 to 10,000 layers. The number of layers in the abrasive body may be chosen, for example, based upon the desired use of the abrasive body. For example, a multilayer abrasive body may be desired when the abrasive body is to be used in severe abrading applications or when the edge of the abrasive body is to be used as the abrading surface. Single layer abrasive bodies may be preferred for light abrading applications where a major surface of the abrasive body is to be used as the abrading surface. Each layer 52, 54 and 56 includes a bond material layer 62, 64 and 66, respectively, a porous material layer 72, 74 and 76, respectively, and an abrasive particle layer 82, 84 and 86, respectively, comprising metal coated abrasive particles 90. Each layer 52, 54 and 56 may also include adhesive layers 92, 94, and 96, respectively, placed on one face of the porous material layers 72, 74, and 76, respectively, and each having at least one face which includes a pressure sensitive adhesive. The adhesive face of the adhesive layers 92, 94 and 96 are positioned against the porous layers 72, 74 and 76, respectively. In this way, when metal coated abrasive particles 90 of abrasive particle layers 82, 84 and 86 are placed in the openings of the porous layers 72, 74 and 76, respectively, the metal coated abrasive particles 90 adhere to the adhesive layers 92, 94 and 96 such that the abrasive particles 90 are retained in the openings of the porous layers 72, 74 and 76. The above mentioned porous layers may be selected from, for example, mesh-type materials (e.g., woven and non-woven mesh materials, metallic and non-metallic mesh materials), vapor deposited materials, powder or powder-fiber materials, and green compacts, any of which include pores or openings distributed throughout the material. It should be understood that the order or placement of the various layers may be different than shown.

The porous layer may be separated or removed from the adhesive layer after the abrasive particles have been received by the adhesive layer. The use of adhesive substrates to retain abrasive particles to be used in a sintering process is disclosed in U.S. Pat. No. 5,380,390 (Tselesin) and U.S. Pat. No. 5,620,489 (Tselesin) and U.S. patent application Ser. No. 08/728,169 (filed Oct. 9, 1996), U.S. Pat. No. 5,817,204 the disclosures of which are incorporated herein by reference.

Layers 52, 54 and 56 are compressed together by top platen 98 and bottom platen 100 to form abrasive body 50. Sintering processes suitable for abrasive body 50 are known in the art and reported in, for example, in U.S. Pat. No. 5,620,489 (Tselesin), the disclosure of which is incorporated herein by reference. It is also contemplated to include two or more bond layers for each layer 52, 54 and 56.

In carrying out the above fabrication process, the bond material making up bond material layers 62, 64 and 66 may be any material sinterable with the abrasive particle layers 82, 84 and 86. Preferably, bond material layers 62, 64 and 66 are a soft, easily deformable flexible material (SEDF) the fabrication of which is known in the art and reported in U.S. Pat. No. 5,620,489. Such SEDF can be formed by forming a paste or slurry comprising a metal bond material (e.g., a metal powder or mixture of metal powders), binder, solvent, thinner and plasticizer. Preferably, the oxygen-scavenger metal is included in the past or slurry, however, the oxygen scavenger metal may also be provided between the layers 52, 54, 56. Preferably, when the oxygen scavenger metal is provided between layers, it is dusted over the abrasive particle layer 82, 84 and 86, more preferably being applied so that it adheres to the adhesive layers 92, 94 and 96. It is to be understood, however, that the oxygen scavenger metal need not be provided between each and every layer making up the stack. Metal bond materials comprise, for example, metal powders comprising bronze, cobalt, tungsten, copper, iron, nickel, tin, chromium, or mixtures or alloys thereof. Optionally, hard particles such as tungsten carbide particles may be added to the slurry, for example, to provide wear resistance in the resulting abrasive body. Abrasive particles may also optionally be included in the paste or slurry. Binder resins include, for example, polyvinyl butyral and may optionally include a plasticizing resin, for example, polyethylene glycol or dioctylphthalate. Components for the composition of an SEDF are commercially available from a number of suppliers including: Sulzer Metco, Inc. (Troy, Mich.), All-Chemie, Ltd. (Mount Pleasant, S.C.), Transmet Corp. (Columbus, Ohio), Valimet, Inc. (Stockton, Calif.), CSM Industries (Cleveland, Ohio), Engelhard Corp. (Seneca, S.C.), Kulite Tungsten Corp. (East Rutherford, N.J.), Sinterloy, Inc. (Selon Mills, Ohio), Scientific Alloys Corp. (Clifton, N.J.), Chemalloy Company, Inc. (Bryn Mawr, Pa.), SCM Metal Products (Research Triangle Park, N.C.), F.W. Winter & Co. Inc. (Camden, N.J.), GFS Chemicals Inc. (Powell, Ohio), Aremco Products (Ossining, N.Y.), Eagle Alloys Corp. (Cape Coral, Fla.), Fusion, Inc. (Cleveland, Ohio), Goodfellow, Corp. (Berwyn, Pa.), Wall Colmonoy (Madison Hts, Mich.) and Alloy Metals, Inc. (Troy, Mich.).

The slurry is cast onto a carrier sheet, for example, a release coated polyester film using a coating apparatus, for example, a knife coater. The cast slurry is then solidified and/or cured at room temperature or with the application of heat to evaporate volatile components (e.g., organic solvents) from the slurry. Certain of the solvents will dry off after coating while the remaining organic compounds will bum off during the sintering process It should also be noted that not every bond layer 62, 64, 66 need be of the same composition.

The porous material may be virtually any material so long as the material is substantially porous (i.e., about 30% to 99.5% porosity) and preferably comprises a plurality of non-randomly spaced openings. Suitable materials are organic or metallic non-woven, or woven mesh materials, such as copper, bronze, zinc, steel, or nickel wire mesh, or fiber meshes (e.g. carbon or graphite). Particularly suitable for use with the present invention are stainless steel wire meshes, expanded metallic materials, and low melting temperature mesh-type organic materials. In the embodiment shown in FIG. 4, a mesh is formed from a first set of parallel wires crossed perpendicularly with a second set of parallel wires to form porous layers 72, 74 and 76. The open portions of the porous material may be larger or smaller than the metal coated abrasive particles. Preferably, diamond abrasive particles of a diameter and shape such that they fit into the holes of the porous material are used as metal coated abrasive particles 90. It is also contemplated to use abrasive particles that are slightly larger than the holes of the porous material and/or particles that are small enough such that a plurality of particles will fit into the holes of the porous material.

The adhesive layers 92, 94 and 96 can be formed from a material having a sufficiently tacky quality to hold abrasive particles, at least temporarily, such as a flexible substrate having a pressure sensitive adhesive thereon. Such substrates having adhesives are well known in the art. The adhesive must be able to hold the abrasive particles during preparation, and preferable should burn off ash-free during the sintering step. An example of a usable adhesive is a pressure sensitive adhesive commonly referred to as Book Tape #895 (commercially available from Minnesota Mining and Manufacturing Company, St. Paul, Minn.).

Figure 5:
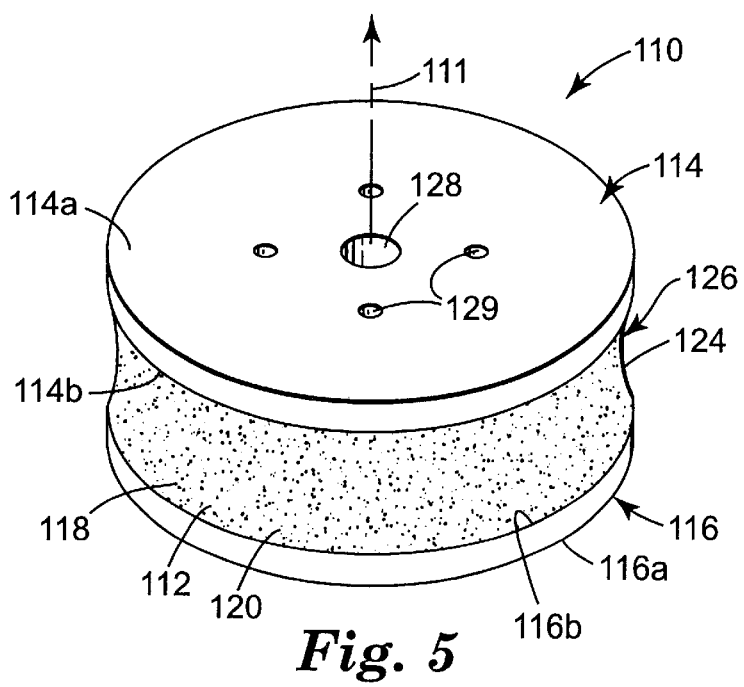
FIG. 5 is a perspective view of a grinding wheel of the present invention.
Figure 6:
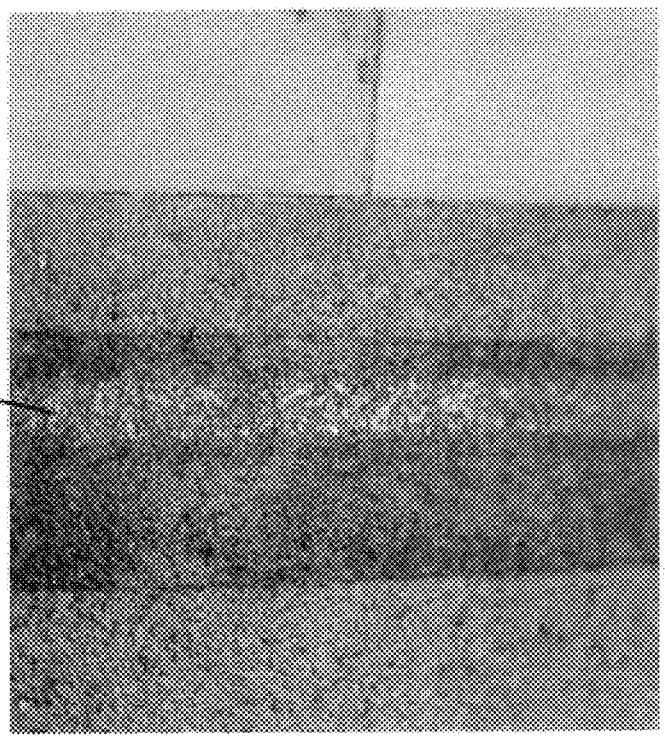
FIG. 6 is a digital image of a surface of a fused metal matrix abrasive body after being subjected to the Rocker Drum Test.

Fused abrasive bodies of the present invention may be utilized in cutting and grinding wheels. Referring to FIG. 5 a perspective view of an embodiment of a cutting or grinding wheel 110 comprising a fused abrasive body of the present invention is shown. Wheel 110 is substantially cylindrical in shape and includes a fused abrasive body 112 of the present invention, preferably sandwiched between a first support plate 114 (having outer major surface 114a and inner major surface 114b) and a second support plate 116 (having outer major surface 116a and inner major surface 116b). Fused abrasive body 112 may comprise a single cylindrically-shaped mass or may be made up of a number of circumferentially extending arcuate segments (see, for example, FIG. 1). Fused abrasive body 112 comprises a plurality of abrasive particles 118 dispersed throughout fused metal matrix 120. Abrasive particles 118 each include an outer adhesion-promoting metal coating (not shown). Fused metal matrix 120 comprises a bond metal and an effective amount of an oxygen scavenger metal. It is understood that the distribution of abrasive particles 118 in metal matrix 120 may be random or non-random, for example, planar layers of abrasive particles. In FIG. 6 the metal coated abrasive particles are randomly distributed throughout the metal matrix. Various abrasive particle distributions and orientations in grinding and cutting wheels are reported in U.S. patent application Ser. No. 09/256,837 (Cessena et al.), filed Feb. 24, 1999, the disclosure of which is incorporated herein by reference.

An outer abrasive surface 124 of sintered abravise body 112 is a substantially cylindrical and whic extends about a portion of the circumferenttial surface 126 of wheel 110. Wheel 110 includes a bore 128 in the center thereof which passes entirely through wheel 110. Bore 128 allows whell 110 to be mounted to a rotatable shaft (not shown) for rotating wheel 110 thereabout. Acordingly, a rotatable shaft placed throught bore 128 would extend along the axis of rotation 111 of wheel 110. It is also contemplated to attach wheel 110 to a rotable shaft by attaching a susbstantially circular monting plate (not shown) having a central shaft (not shown) to wheel 110 using mounting holes 129. By rotating wheel 110 on or by a rotatable shaft, a workpiece can be held against the circumferential surface 126 of wheel 110 to be abraded by abrasive surface 124 so that the workpiece can be appropriately shaped, gournd or cut.

EXAMPLES

The following non-limiting examples will further illustrate the invention. All parts, percentages, ratios, etc. in the examples are by weight unless otherwise indicated.

Commercially available metal powders were mixed to provide the slurry composition shown in Table 2. The metal powders used to prepare the slurries had a median particle size of about 50 $\mu$m and were commercially available from Lucas Milhaupt, Inc. (Cudacky, Wis.) and Wall Colmony Corp. (Madison, Mich.). The polyvinyl butyral was commercially available under the trade designation "BUTVAR B-76" from Solutia Inc (St Louis, Mo.). The Santicizer 160 was commercially available from Solutia Inc. (St. Louis, Mo.).

TABLE 2

| MATERIAL | PARTS BY WT. |
| --- | --- |
| copper | 39.23 |
| iron | 32.01 |
| nickel | 9.16 |
| tin | 3.97 |
| chromium | 2.83 |
| boron | 0.40 |
| silica | 0.51 |
| tungsten carbide | 10.92 |
| cobalt | 0.78 |
| phosphorus | 0.20 |
| organics: | |
| methyl ethyl ketone | 11.58 |
| polyvinyl butyral | 1.43 |
| Santicizer 160 | 0.65 |

Examples 1–3

For Examples 1–3 the basic slurry composition shown in Table 3 was modified by adding various amounts of aluminum powder, as shown below.

Slurry 1: 0.25%-wt. aluminum powder based on total weight of slurry, excluding organics.

Slurry 2: 0.50%-wt. aluminum powder based on total weight of slurry, excluding organics.

Slurry 3: 1%-wt. aluminum powder based on total weight of slurry, excluding organics.

Slurry A: no aluminum powder added.

The aluminum powder used was commercially available under the trade designation "ALUMINUM METAL, FINEST POWDER, A-559" from Fisher Scientific Company (Fair Lawn, N.J.). Slurries 1–3 and slurry A were cast into metal tapes using a knife coater to control the thickness of the tapes. The slurries were cast onto a polyester release liner. The final areal density of the metal tapes after evaporation of the solvent was was about 0.75 grams/in$^2$(0.116 grams/cm$^2$).

Diamond/tape laminate layers were prepared by first adhering a pressure sensitive adhesive tape to one side of a stainless steel mesh. The stainless steel mesh had about 165 wires per inch (65 wires per cm) and was made of 0.019 inch (0.483 mm) wire. The adhesive tape was commercially available under the trade designation "845 BOOK TAPE" from Minnesota Mining and Manufacturing Company, St. Paul, Minn. The diamond abrasive particles were dropped over the wire mesh so that one diamond filled each hole in the mesh and adhered to the adhesive surface of the tape. The abrasive particles comprised diamond having approximately a 1 μm thick outer coating of titanium. The diamond abrasive particles had a size of about 170/200 U.S. Std Mesh and were commercially available under the trade designation "MBG-640TI" from General Electric Co., Worthington, Ohio. Diamond abrasive particles in exces of 1 per screen opening were removed.

After the diamonds were adhered to the adhesive tape, the wire mesh was removed from the tape leaving the diamonds adhered to the tape in a square array. The diamond/tape laminate layer was then placed in contact with a major surface of a layer of the cast metal tapes described above. The other major surface of the cast metal tape was placed in contact with a 0.010 inch (0.254 mm) thick layer of copper metal. As a result, each sample comprised one diamond layer, one layer of metal tape, and one layer of copper metal.

Comparative Example B and Example 4 were prepared with a doping of copper(II)oxide powder. The purpose of the copper(II) oxide dope was to introduce oxygen into the compositions prior to sintering in order to demonstrate the deleterious effect of oxygen on the adhesion of the titanium coated diamond abrasive particles in a sintered metal matrix.

Comparative Example B

Comparative Example B was prepared as Comparative Example A with the following changes. After preparing a diamond/tape laminate as in Comp. Ex. A, the laminate was dusted with copper(II)oxide powder which adhered to the exposed adhesive surface on the tape. Excess powder was removed.

Example 4

Example 4 was prepared as Comparative Example A with the following changes. After preparing a diamond/tape laminate as in Comp. Ex. A, the laminate was dusted with a mixture of copper(II) oxide and aluminum powder. The mixture was prepared by ball milling 20 grams of aluminum with 108 grams of copper(II) oxide. This mixture comprised about a 50% stochiometric excess of aluminum over the amount required to reduce the copper(II)oxide to copper. The mixture of copper(II)oxide powder and aluminum adhered to the exposed adhesive surface on the tape. Excess powder was removed.

Examples 1–4 and Comp. Examples A-B were stacked on top of one another with a 0.25 inch (0.365 cm) thick graphite plate separating adjacent samples. The stack comprising the six samples and the graphite spacer plates was then placed in a hydraulic sintering press in an oven. The stack was then sintered in air according to the sintering profile shown in Table 3.

TABLE 3

| Time (sec) | Temp. (° C.) | Pressure (kg/cm²) |
|---|---|---|
| 0 | 20 | 0 |
| 550 | 420 | 100 |
| 730 | 420 | 100 |
| 950 | 550 | 100 |
| 1130 | 550 | 100 |

TABLE 3-continued

| Time (sec) | Temp. (° C.) | Pressure (kg/cm²) |
|---|---|---|
| 1210 | 590 | 100 |
| 1240 | 590 | 100 |
| 1750 | 880 | 200 |
| 2110 | 880 | 200 |
| 2430 | 1007 | 200 |
| 2790 | 1007 | 200 |
| 2970 | 870 | 250 |
| 3330 | 850 | 400 |

Test Procedure 1: Rocker Drum Test

A rocker drum testing machine designed for the testing of abrasives under high pressure was employed to test the sintered abrasive bodies of the Examples and Comparative Examples. The rocker testing machine comprised a motor driven drum having a diameter of 13 inches and a width of 16 inches. The drum is driven by a motor through an eccentric link such that the drum oscillates (rotates) back and forth with a 5.5 inch (13.97 cm) stroke. Each back and forth cycle takes one second. Four abrasive samples can be attached to the surface of the drum and four separate pivot arms each hold a test workpiece against a sample. Water lines feed each sample and provide a slow flow of cooling water over the surface of each sample. The cooling water flow rate results in about one gallon of water flowing over each sample per thousand cycles.

Example 4 and Comp Ex. B were each tested for 1000 cycles using the Rocker Drum Test of Test Procedure 1. The workpieces used were 0.1875 inch (0.476 cm) square steel rods which were held perpendicular to the surface of the samples. The workpieces were pressed against the samples using an 8 lb (3.63 kg) weight. After performing the Rocker Drum Test, a visible wear line was present on the surface of each of the abrasive samples.

Figure 7:
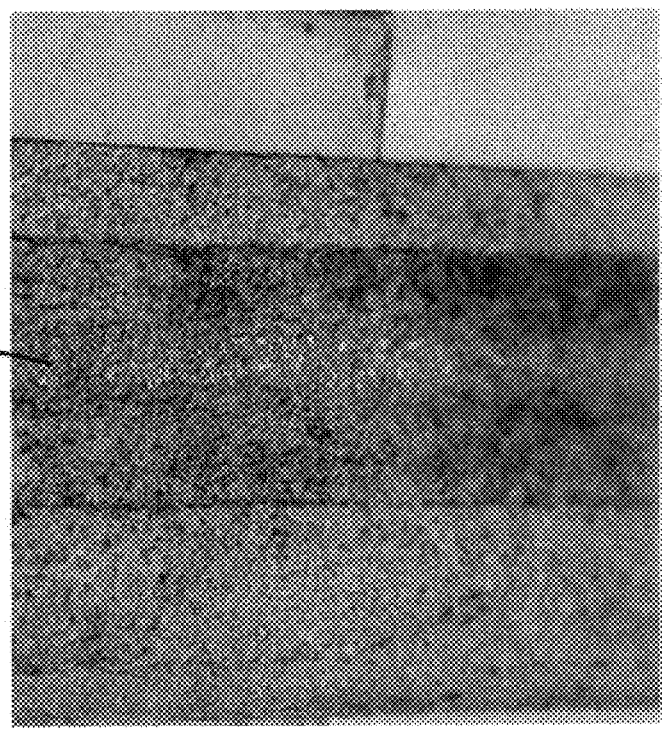
FIG. 7 is a digital image of a surface of fused metal matrix abrasive body of the present invention after being subjected to the Rocker Drum Test.
Figure 8:
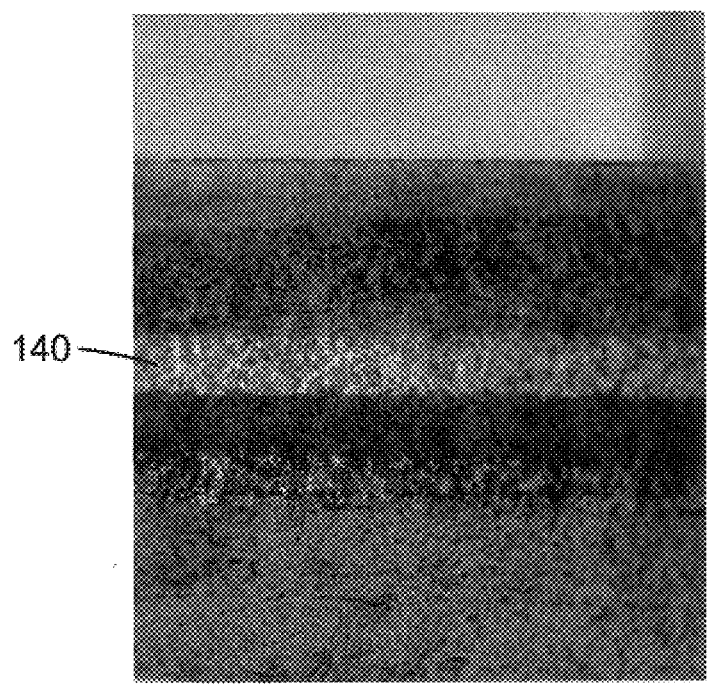
FIG. 8 is a digital image of a surface of a fused metal matrix abrasive body after being subjected to the Rocker Drum Test.
Figure 9:
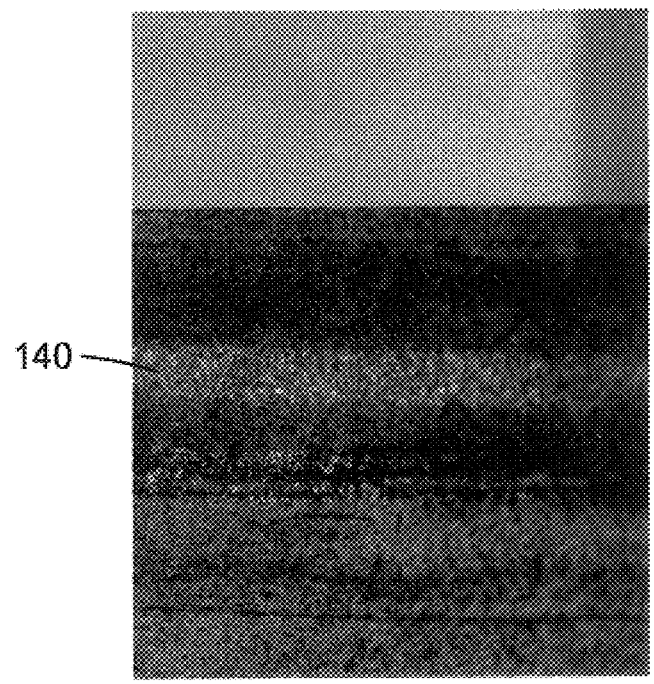
FIG. 9 is a digital image of a surface of a fused metal matrix abrasive body of the present invention after being subjected to the Rocker Drum Test.

After rocker drum testing the abrasive bodies of the Example 4 and Comp. Ex. B were examined visually. The wear line on Comparative Example B was significantly brighter than the wear lines on Example 4. The brightness of the wear line indicates that more abrasive particles were dislodged from the sample during the Rocker Drum Test. Photographs of the samples were taken at a magnification of 1.4. FIGS. 6 and 7 are digital images of Comp. Ex. B and Example 4, respectively. The wear line in each figure is labeled as 130.

Examples 1–3 and Comp Ex. A were tested for 1000 cycles using the Rocker Drum Test. The workpieces used were 0.1875 inch (0.476 cm) square steel rods which were held perpendicular to the surface of the abrasive bodies. The workpieces were pressed against the abrasive bodies using an 8 lb (3.63 kg) weight. The abrasive bodies were then repositioned so that that a second wear line would form on the workpieces. The Rocker Drum Test was then conducted for 3000 cycles using a 10 lb (4.54 kg) weight. The resulting samples were photographed using a magnification of 1.4×.

Microscopic examination of the wear lines revealed small areas where the diamonds were removed from the surface of the samples. The brightness of the wear lines resulted from the metal being worn smooth after the diamonds had been dislodged. FIGS. 8–11 are digital images of Comp. Ex. A and Examples 1–3, respectively. The wear line in each figure is labeled as 140. Comp Ex. A (FIG. 8) shows the most wear. Examples 1, 2 and 3 (FIGS. 9–11, respectively) show decreasing amounts of wear, respectively, corresponding with an increase in the amount of aluminum added.

Test Procedure 2: Water Jet Erosion Test

A high pressure water jet was employed to dislodge diamond abrasive particles from from the abrasive bodies of the Examples and Comparative Examples. The number of abrasive particles which were dislodged from each sample was used as a measure of the adhesion between the sintered metal matrix of the abrasive body and the abrasive particles.

The high pressure water jet apparatus comprised a water jet commercially available under the trade designation "RE 2000 NT CNC" from Romero Engineering Inc., Fort Worth, Tex. The water jet was connected to a pressure intensifier commercially available under the trade designation "SV-IV Intensifier" from Inersoll-Rand Co., Water Jet Systems, KS. The water was delivered to the samples through a four nozzle pneumatic robotic swivel head commercially available from Jet Edge, Minneapolis, Minn. During the testing the swivel head rotated at about 1800 rpm. The flow rate of water through the water jet was approximately one gallon per minute at a pressure of 44,000 psi (303 Mpa).

Two passes were made across each of the samples with the water jet. The swivel head was positioned 2.5 inches (6.35 cm) from the surface of the samples during the passes. During each pass the water jet washed an area about 1 inch (2.54 cm) wide on the samples. The second pass was made over an area of the samples not washed by the first pass. The first pass across the samples was made at 50 inches per minute (127 cm/min) and did not dislodge a substantial number of diamond abrasive particles. The second pass was conducted at a rate of 15 inches per minute (38.1 cm/min). This pass resulted in a substantial number of diamond abrasive particles being dislodged from the abrasive bodies. Photographs were taken of the surface of the samples using a microscope commercially available under the trade designation "NIKON SMZ-2T STEREO-ZOOM."

The number of diamond abrasive particles dislodged by the water stream was quantitated by visual inspection of the samples using a microscope having a magnification range from 10–63×. A photograph of the surface of each sample was taken at constant magnification and the number of diamond abrasive particles in the photograph was counted. The square array of diamond abrasive particles, present initially in the samples, allowed comparison of the number of diamond abrasive particles between the samples. The results are reported in Table 4.

TABLE 4

| | Number of Abrasive Particles in Sample | Abrasive Particle Retention (% increase over control) |
|---|---|---|
| Comp. Ex. A | 93 | 100% (Control for Ex. 1–3) |
| Example 1 | 131 | 141% |
| Example 2 | 141 | 152% |
| Example 3 | 148 | 159% |
| Comp. Ex. B | 40 | 100% (Control for Ex. 4) |
| Example 4 | 85 | 213% |

Patents and patent applications disclosed herein are incorporated by reference as if individually incorporated. It is to be understood that the above description is intended to be illustrative and not restrictive. Various modifications and alterations of this invention will become apparent to those skilled in the art from the foregoing description without departing from the scope and the spirit of this invention, and it should be understood that this invention is not to be unduly limited to the illustrative embodiments set forth herein.

What is claimed is:

1. A fused metal matrix abrasive body comprising:
   a plurality of metal coated abrasive particles wherein each of said particles comprises an abrasive particle having an outer adhesion-promoting coating comprising a metal;
   a fused metal matrix comprising a bond metal and an effective amount of an oxygen scavenger metal;
   wherein the metal coated abrasive particles are distributed in the fused metal matrix which bonds the metal coated abrasive particles together.

2. The fused metal matrix abrasive body of claim 1, wherein said metal matrix abrasive body was fused at a temperature and a pressure and wherein with reference to an Ellingham diagram the oxygen scavenger metal provides a partial pressure of oxygen which is less than the partial pressure of oxygen provided by the metal comprising the adhesion promoting coating on the abrasive particles, the partial pressures of oxygen being determined from the Ellingham diagram at said temperature and said pressure.

3. The fused metal matrix abrasive body of claim 1, wherein said metal matrix abrasive body was fused at a temperature and at a pressure and wherein with reference to an Ellingham diagram the Gibbs free energy of oxidation for the oxygen scavenger metal is less than the Gibbs free energy of oxidation for the metal comprising the adhesion promoting coating on the abrasive particles, the Gibbs free energies of oxidation being determined from the Ellingham diagram at said temperature and said pressure.

4. The fused metal matrix abrasive body of claim 1, wherein the abrasive particles comprise diamond, cubic boron nitride or a mixture thereof.

5. The fused metal matrix abrasive body of claim 4, wherein the outer adhesion promoting metal coating comprises titanium and wherein the oxygen scavenger metal comprises aluminum, calcium, magnesium, titanium, zirconium or a combination thereof.

6. The fused metal matrix abrasive body of claim 4, wherein the outer adhesion promoting metal coating comprises chromium and wherein the oxygen scavenger metal comprises aluminum, calcium, magnesium, manganese, silicon, titanium, or a combination thereof.

7. The fused metal matrix abrasive body of claim 4, wherein the outer adhesion-promoting metal coating comprises titanium, chromium, organ alloy thereof.

8. The fused metal matrix abrasive body of claim 4, wherein the oxygen scavenger metal comprises aluminum, calcium, magnesium, manganese, silicon, titanium, zirconium or a combination thereof.

9. The fused metal matrix abrasive body of claim 4, wherein the abrasive particles comprise diamond having an outer adhesion-promoting coating comprising titanium and wherein the oxygen scavenger metal comprises aluminum which is present in an amount ranging from about 0.1–10%-wt. of the fused metal matrix.

10. The fused metal matrix abrasive body of claim 4, wherein the oxygen scavenger metal comprises from about 0. 1–10%-wt. of the fused metal matrix.

11. The fused metal matrix abrasive body of claim 4, wherein the bond metal comprises bronze, cobalt, tungsten, copper, iron, nickel, tin, chromium, or mixtures or alloys thereof.

12. The fused metal matrix abrasive body of claim 4, wherein the abrasive particles are randomly distributed in the fused metal matrix.

13. The fused metal matrix abrasive body of claim 4, wherein the abrasive particles are non-randomly distributed in the fused metal matrix.

14. The fused metal matrix abrasive body of claim 13, wherein the abrasive particles are concentrated in the metal matrix in parallel planar layers of abrasive particles.

15. The fused metal matrix abrasive body of claim 1, wherein the metal matrix is fused by sintering, brazing, melting, impregnating or a combination thereof.

16. A grinding wheel comprising at least one fused abrasive body of claim 1.

17. A sintered metal matrix abrasive body comprising:

a plurality of metal coated diamond abrasive particles wherein each of said particles comprises an abrasive particle having an outer adhesion-promoting coating comprising a metal selected from the group consisting of titanium and chromium;

a sintered metal matrix comprising a bond metal having uniformly dispersed therein an effective amount of an oxygen scavenger metal selected from the group consisting of aluminum, calcium, magnesium, titanium, manganese, silicon and zirconium;

wherein the metal coated abrasive particles are distributed in the sintered metal matrix which bonds the metal coated abrasive particles together.

* * * * *

UNITED STATES PATENT AND TRADEMARK OFFICE
CERTIFICATE OF CORRECTION

PATENT NO.   : 6,416,560 B1
DATED        : July 9, 2002
INVENTOR(S)  : Palmgren, Gary M.

It is certified that error appears in the above-identified patent and that said Letters Patent is hereby corrected as shown below:

Title page,
Item [56], References Cited, OTHER PUBLICATIONS, reference "The MBS *900 Series Product Line" delete "P;roduct" and insert in place thereof -- Product --.

Column 5,
Line 60, delete "howcer" and insert in place thereof -- however --.

Column 12,
Line 63, delete "bum" and insert in place thereof -- burn --.
Line 63, insert -- . -- following "process".

Column 13,
Line 59, delete "sintered" and insert in place thereof -- fused --.
Line 59, delete "abravise" and insert in place thereof -- abrasive --.
Line 60, delete "whic" and insert in place thereof -- which --.
Line 60, delete "and" and insert in place thereof -- band --.
Line 61, delete "circumferenttial" and insert in place thereof -- circumferential --.
Line 63, delete "whell" and insert in place thereof -- wheel --.
Line 65, delete "Acordingly," and insert in place thereof -- Accordingly, --.
Line 66, delete "throught" and insert in place thereof -- through --.

Column 14,
Line 1, delete "rotable" and insert in place thereof -- rotatable --.
Line 2, delete "monting" and insert in place thereof -- mounting --.
Line 7, delete "gournd" and insert in place thereof -- ground --.

Column 15,
Line 11, delete "exces" and insert in place thereof -- excess --.

Column 17,
Line 3, delete "from" preceding "the".

UNITED STATES PATENT AND TRADEMARK OFFICE
CERTIFICATE OF CORRECTION

PATENT NO. : 6,416,560 B1
DATED : July 9, 2002
INVENTOR(S) : Palmgren, Gary M.

It is certified that error appears in the above-identified patent and that said Letters Patent is hereby corrected as shown below:

<u>Column 18,</u>
Line 41, delete "organ" and insert in place thereof -- or an --.

Signed and Sealed this

Ninth Day of September, 2003

JAMES E. ROGAN
*Director of the United States Patent and Trademark Office*